United States Patent
Wong et al.

(10) Patent No.: US 7,512,139 B2
(45) Date of Patent: Mar. 31, 2009

(54) METHODS AND SYSTEMS FOR ENABLING REMOTE BOOTING OF REMOTE BOOT CLIENTS IN A SWITCHED NETWORK DEFINING A PLURALITY OF VIRTUAL LOCAL AREA NETWORKS (VLANS)

(75) Inventors: Steven Wong, San Francisco, CA (US); C. Brem Chandar, Melbourne (AU); Kin Au, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 574 days.

(21) Appl. No.: 11/435,904

(22) Filed: May 16, 2006

(65) Prior Publication Data

US 2007/0268917 A1    Nov. 22, 2007

(51) Int. Cl.
*H04L 12/28* (2006.01)
*H04L 12/56* (2006.01)
*G06F 15/16* (2006.01)
*G06F 15/173* (2006.01)
*G06F 15/177* (2006.01)

(52) U.S. Cl. .................... 370/401; 370/254; 709/203; 709/219; 709/223; 713/2

(58) Field of Classification Search ............... None
See application file for complete search history.

(56) References Cited

U.S. PATENT DOCUMENTS 6,810,478 B1 * 10/2004 Anand et al. ............... 713/2

(Continued)

OTHER PUBLICATIONS

The Institute of Electrical and Electrictronics Engineers, Inc., "IEEE Standards for Local and metropolitan area networks, Virtual Bridged Local Area Networks", IEEE Std 802.1Q TM, 2003 Edition, pp. 1-312 (May 7, 2003).

(Continued)

*Primary Examiner*—Wing F Chan
*Assistant Examiner*—Hicham B Foud
(74) *Attorney, Agent, or Firm*—Young Law Firm, P.C.

(57) ABSTRACT

A method of enabling remote booting of a remote boot client in a switched network defining a plurality of virtual local area networks (VLANs). The switched network may include a first trunking aware switch, a first remote boot client and a remote boot server and the method may include setting a first port of the first trunking aware switch to a first mode in which traffic received on the first port set in the first mode is directed to a first predetermined native VLAN of the plurality of VLANs; receiving a request for remote boot from the first remote boot client on the first port of the first trunking aware switch, the first port being set in the first mode; directing the request for remote boot from the first trunking aware switch to a second port of the remote boot server, the second port being configured to receive traffic on the first predetermined native VLAN; receiving selected files from the remote boot server on the first predetermined native VLAN and forwarding the received files to the first remote boot client on the first predetermined native VLAN, the selected files being operative to enable the first remote boot client to initiate loading and booting a selected operating system, and switching the first port of the first trunking aware switch from the first mode to a second mode that enables the first remote boot client to specify one of the plurality of VLANs and to send traffic to the first trunking aware switch on the specified one of the plurality of VLANs.

21 Claims, 4 Drawing Sheets

U.S. PATENT DOCUMENTS

| | | | |
|---|---|---|---|
| 7,080,134 B2 * | 7/2006 | Doherty et al. ............. | 709/221 |
| 7,350,068 B2 * | 3/2008 | Anderson et al. ............. | 713/2 |
| 7,418,588 B2 * | 8/2008 | Lin et al. ............. | 713/2 |
| 2003/0018763 A1 * | 1/2003 | Doherty et al. ............. | 709/223 |
| 2003/0097422 A1 | 5/2003 | Richards et al. | |
| 2004/0081104 A1 | 4/2004 | Pan et al. | |
| 2004/0210623 A1 | 10/2004 | Hydrie et al. | |
| 2005/0091387 A1 | 4/2005 | Abe | |
| 2005/0144431 A1 | 6/2005 | Lin et al. | |
| 2006/0075217 A1 * | 4/2006 | Takamoto et al. ............. | 713/2 |
| 2006/0253565 A1 * | 11/2006 | Doherty et al. ............. | 709/223 |

OTHER PUBLICATIONS

An Oracle White Paper, "Oracle Application Server 10g: The Best Application Server for the Oracle Database" pp. 1-17 (Dec. 2004).

Noorg—Speaking: Nov. 20, 2003—Unigroup, New York City, http://www.noorg.org/speaking/unigroup/11202003.html, printed Aug. 26, 2005 (2pgs).

Joshua Birnbaum, Richard L. Kline, "Project ifchk: Host Based Promiscuous Mode Detection and Handling", pp. 6.1-6.6, 2004.

OSI model—Wikipedia, the free encyclopedia, "OSI model", http://en.wikipedia.org/wiki/OSI_model, pp. 1-7, printed Aug. 26, 2005.

Wikipedia, "Virtual LAN", http://en.wikipedia.org/wiki/VLAN, printed Aug. 26, 2005 (2pgs).

Wikipedia, "IEEE 802.1q", http://en.wikipedia.org/wiki/IEEE_802.1Q, printed Aug. 26, 2005 (2gps).

Wikipedia, "Dynamic Host Configuration Protocol", http://en.wikipedia.org/wiki/Dynamic_Host_Configuration_Protocol, printed Aug. 4, 2005 (4pgs).

Local and Metropolitan Area Networks, IEEE, Std 802.1Q. 2003 Edition, "Annex D", pp. 284-289.

Wikipedia, "Network segment", http://en.wikipedia.org/wiki/Network_segment, printed Oct. 20, 2005 (1pg).

Wikipedia, "Network switch", http://en.wikipedia.org/wiki/Network_switch, printed Oct. 20, 2005 (2pgs).

Webopedia, "MAC address", http://webopedia.com/TERM/M/MAC_address.html, printed Aug. 4, 2005 (2pgs).

Cisco IOS Release (12.0(24)S1, "Bridging Between IEEE 802.1Q VLANs", pp. 1-18.

Cisco Systems White Paper, "Virtual LAN Communication", pp. 1-14 (1995).

Cisco Systems, "VFrame: Reducing TCO by Virtualizing the Data Center", http://www.okena.com/en/US/products/ps6429/products_white_paper0900aecd80337ba2 . . . , printed Oct. 20, 2005 (10pgs).

Cisco Systems, "Designing Switched LAN Internetworks", http://www.cisco.com/univercd/cc/td/doc/cisintwk/idg4/nd2012.htm, printed Oct. 26, 2005 (33pgs).

George Ou, "An introduction to VLAN Trunking", http://www.lanarchitect.net/Articles/VLANTrunking/Introduction/, printed Oct. 26, 2005 (3pgs).

Cisco Systems, Virtual LANs/VLAN Trunking Protocol (VLANs/VTP), http://www.cisco.com/en/US/tech/tk389/tk689/tsd_technology_support_protocol_home.h . . . , printed Oct. 26, 2005 (1pg).

"Preboot Execution Environment", http://searchnetworking.techtarget.com/sDefinition/0,,sid7_gci214447,00.html, printed Aug. 2, 2005 (3pgs).

"802.1Q—Virtual LANs", http://www.ieee802.org/1/pages/802.1Q.html, printed Aug. 2, 2005 (1pg).

"Preboot Execution Environment (PXE)", http://msdn.microsoft.com/library/en-us/randz/protocol/pxe.asp?frame=true, printed Aug. 2, 2005 (1pg).

Wikipedia, "Preboot Execution Environment", http://en.wikipedia.org/wiki/Pre-Boot_Execution_Environment, printed Aug. 2, 2005 (3pgs).

Wikipedia, "IEEE 802.1q", http://en.wikipedia.org/wiki/IEEE_802.1q, printed Aug. 4, 2005 (2pgs).

* cited by examiner

METHODS AND SYSTEMS FOR ENABLING REMOTE BOOTING OF REMOTE BOOT CLIENTS IN A SWITCHED NETWORK DEFINING A PLURALITY OF VIRTUAL LOCAL AREA NETWORKS (VLANS)

BACKGROUND OF THE INVENTION

1. Field of the Invention

The present invention relates to computer-implemented methods and systems for remotely installing an operating system on a diskless and/or stateless computer system in a switched network defining a plurality of virtual local area networks.

2. Description of the Prior Art and Related Information

A virtual Local Area Network (VLAN) is a way of segmenting a local area network into several logical networks. These logical networks may reside on the same physical network, but offer a mechanism to allow groups of users to establish their own logical network to securely share data and resources. Several VLANs can co-exist on a single switch, which is a computing device that connects network segments. Switches provide all necessary filtering, identification and transporting of the frames transmitted within and between VLANs. One method for segmenting users into VLANs is through the use of tags, a way of identifying packets through the use of VLAN identifier (VID) bits. IEEE protocol 802.1q is the currently predominant protocol for enabling several VLANs to co-exist on a single switch. The 802.1q protocol calls for a 12 bit VID header (among other fields) to be added to the standard Ethernet header, which enables the identification of a theoretical maximum of $2^{12}$ or 4096 VLANs. A non 802.1q Ethernet frame may be 1518 bytes in length, whereas an 802.1q Ethernet frame may include 1522 bytes, to account for the overhead of specifying the VLAN and other housekeeping issues as specified in the IEEE 802.1q standards. Therefore, the switch may identify the VLAN to which a particular frame is to be routed based upon the tag of that frame, which tag contains the VID. Prior to routing the packet to its intended target on the identified VLAN, the switch may strip the header of its VID and other fields that may have been added by the VLAN protocol. Other methods for routing packets to particular VLANs exist, such as packet filtering, for example.

Ports on a switch may be assigned to a single VLAN in a static manner. Static VLANs are very secure and do not require the network administrator to maintain table of Media Access Control (MAC) addresses and/or filtering tables. MAC addresses are hardware address that uniquely identify node of a network. Each port on a switch may also be dynamically assigned to multiple VLANs depending upon, for example, the MAC address of the target destination of the frame being transported. Such ports are called dynamic VLANs. Ports may be configured and operated in three modes. The first mode may be an access mode (also variously called untagged or promiscuous/isolated mode), in which a port is assigned a specific native VLAN and all Ethernet traffic from devices coupled to the port will only be visible to ports configured to the same native VLAN. The second mode is a tagged mode (also variously called trunking or "dot1q"), in which frames from devices coupled to the port must include the VID to identify to the switch to which VLAN the frame is to be routed. Ports configured in trunk mode according to the 802.1q protocol are typically called "dot1q" configured ports. The third mode is a combination of the first and second modes, where the first mode's boot-up VLAN must also be specified at "dot1q" level for clients spanning across more than one dot1q enabled switch and ports can only be set in promiscuous mode.

In order for a server to access multiple VLANS, the server must include a Network Interface Card (NIC), a network cable and a port on the switch for each VLAN to which access is desired. For a server to access three VLANs, for example, the following is required: three NICs, three cables and three network ports, on for each VLAN to which the server wishes to access. Servers are typically mounted in racks, and each rack may have, for example, 18 servers. For each server within the rack to access three VLANs, therefore, a total of 54 cables are necessary, exclusive of the power cables, switch cables to distribution switches, and remote management interface(s). If High-Availability (bonding) is to be provided for each VLAN, a total of 108 cables may be required for each rack. It is not unusual for high capacity data centers to have many racks of servers. From the foregoing, it becomes clear that the cost of purchasing, installing, managing and maintaining such cables is not inconsequential for large scale data center operations. Moreover, such a large number of cables increases the likelihood of cable failures and may increase the downtime of the constituent servers in the individual racks.

The 802.1q defines a protocol that, among other benefits, allows for a reduction in the number of cables needed by a server to access multiple VLANs, since a single cable may carry Ethernet traffic destined to any one of a plurality of VLANs. Other protocols exist for accessing and managing several VLANs, such as Cisco Systems' proprietary ISL protocol, for example. Implementation of the 802.1q protocol and like protocols simplifies the network architecture, decreases the costs associated with enabling servers to access multiple VLANs and increases the reliability of the network.

It is often desired to return individual servers to a reference state. To insure that the servers may be returned to such a reference state, diskless and stateless servers may be used to good advantage. Such diskless/stateless servers may store and operate their operating system on and from a Random Access Memory (RAM) disk. Also useful is the ability to load and boot such a diskless/stateless server using a selected one of several operating systems, and to do so remotely. Such a remotely booted diskless/stateless server may be loaded with a selected operating system and returned to a reference state (in effect, "wiped clean"), affording the network administrator with a great degree of flexibility in how such servers are deployed. To enable such remote loading and booting, a client/server interface called Preboot Execution Environment (PXE—pronounced "Pixie") may be implemented, among other proprietary and/or open protocols. PXE allows network computers to load and boot their operating system remotely by a system administrator.

Network File System (NFS) is a protocol that allows a computer to access files over a network as easily as if they were on its local disks. NFS is strongly associated with UNIX systems, though it can be used on other platforms. RAMFS is a RAM Filesystem in which the operating system (such as versions of Unix or Linux, for example) is loaded over the network into the server's RAM. In this manner, the server may be diskless and stateless, as noted above. Problems arise, however, when attempting to use PXE in an 802.1q environment, as PXE (and similar remote booting protocols) does not provide for the 802.1q trunking technology, which allows multiple segmented networks (VLANs) to use a single cable (or two cables when High-Availability bonding technology is used). Accordingly, when it is desired for servers to have the ability to remotely load and boot their operating system from the network, it is currently not possible to benefit from the economies afforded by the 802.1q protocols or other similar trunking protocols. This means that when remote boot operations are required in a multiple VLAN system, it is necessary to revert back to the costly and complex one cable/one NIC/one VLAN conventional architecture. Diskless/stateless systems (that is, systems that require the ability to remotely load and boot their operating system), therefore, are conventionally unable to couple to a trunking port of a switch configured according to the 802.1q or similar protocol.

From the foregoing, it may be appreciated that methods and systems are needed that would allow such diskless/stateless servers to load and boot their operating systems remotely over network configured according to a trunking protocol, such as, for example, the IEEE 802.1q protocol.

SUMMARY OF THE INVENTION

Embodiments of the present invention include a computer-implemented method of enabling remote booting of a remote boot client in a switched network defining a plurality of virtual local area networks (VLANs), the switched network including a first trunking aware switch, a first remote boot client and a remote boot server. The computer-implemented method may include steps of setting a first port of the first trunking aware switch to a first mode in which traffic received on the first port set in the first mode is directed to a first predetermined native VLAN of the plurality of VLANs; receiving a request for remote boot from the first remote boot client on the first port of the first trunking aware switch, the first port being set in the first mode; directing the request for remote boot from the first trunking aware switch to a second port of the remote boot server, the second port being configured to receive traffic on the first predetermined native VLAN of the plurality of VLANs; receiving selected files from the remote boot server on the first predetermined native VLAN and forwarding the received files to the first remote boot client on the first predetermined native VLAN, the selected files being operative to enable the first remote boot client to initiate loading and booting a selected operating system, and switching the first port of the first trunking aware switch from the first mode to a second mode that enables the first remote boot client to specify one of the plurality of VLANs and to send traffic to the first trunking aware switch on the specified one of the plurality of VLANs.

The switched network may be 802.1q compliant. The switched network may further include a network file system coupled to the switch, and the method may further include a step of the first remote boot client requesting additional files from the network file system over the first port configured in the second mode. The request for remote boot in the receiving step may be carried out according to the Preboot Execution Environment (PXE) standard client-server interface. A step of the first trunking aware switch receiving traffic from the first remote boot client may also be carried out, the received traffic including frames comprising VLAN tags specifying one of the plurality of VLANs. The selected files in the receiving step may enable the first remote boot client to create a RAM disk that is configured to be mounted as a root file system from to enable programs to be run from the mounted RAM disk. The switched network may include a second remote boot client that is coupled to a second trunking aware switch, the second trunking aware switch being coupled to the first trunking aware switch via ports configured in the second mode that enable the second remote boot client to specify one of the plurality of VLANs in addition to the first predetermined native VLAN. The method may further include a step of the second remote boot client requesting remote boot on the first predetermined native VLAN and receiving selected files from the remote boot server, across both first and second trunking aware switches, on the first predetermined native VLAN via the ports configured in the second mode.

According to another embodiment thereof, the present invention is a computer system suitable for enabling remote booting of a first remote boot client in a switched network defining a plurality of native virtual local area networks (VLANs). The computer system may include a first remote boot client; a remote boot server; a first trunking aware switch, the first trunking aware switch including: at least one processor; a plurality of processes spawned by said at least one processor, the processes including processing logic for: setting a first port of the first trunking aware switch to a first mode in which traffic received on the first port set in the first mode is directed to a first predetermined native VLAN of the plurality of VLANs; receiving a request for remote boot from the first remote boot client on the first port of the first trunking aware switch, the first port being set in the first mode; directing the request for remote boot from the first trunking aware switch to a second port of the remote boot server, the second port being configured to receive traffic on the first predetermined native VLAN of the plurality of VLANs; receiving selected files from the remote boot server on the first predetermined VLAN and forwarding the received files to the first remote boot client on the first predetermined native VLAN, the selected files being operative to enable the first remote boot client to initiate loading and booting a selected operating system, and switching the first port of the first trunking aware switch from the first mode to a second mode that enables the first remote boot client to specify one of the plurality of VLANs and to send traffic to the first trunking aware switch on the specified one of the plurality of VLANs.

The switched network may be 802.1q compliant, for example. The switched network may further include a network file system coupled to the switch, and the method may further include a step of the first remote boot client requesting additional files from the network file system over the first port configured in the second mode. The request for remote boot in the receiving step may be carried out according to the Preboot Execution Environment (PXE) standard client-server interface. A step of the first trunking aware switch receiving traffic from the first remote boot client may be carried out, the received traffic including frames comprising VLAN tags specifying one of the plurality of VLANs. The selected files in the receiving step may enable the first remote boot client to create a RAM disk that is configured to be mounted as a root file system from to enable programs to be run from the mounted RAM disk. The switched network may include a second remote boot client that is coupled to a second trunking aware switch, the second trunking aware switch being coupled to the first trunking aware switch via ports configured in the second mode that enable the second remote boot client to specify one of the plurality of VLANs in addition to the first predetermined native VLAN. The method may further include a step of the second remote boot client requesting remote boot on the first predetermined native VLAN and receiving selected files from the remote boot server, across both first and second trunking aware switches, on the first predetermined native VLAN via the ports configured in the second mode.

According to yet another embodiment, the present invention is a machine-readable medium having data stored thereon representing sequences of instructions which, when executed by a first trunking aware switch, causes said first trunking aware switch to enable remote booting of a first remote boot client in a switched network defining a plurality of native virtual local area networks (VLANs) and including a first remote boot client and a remote boot server, by performing the steps of setting a first port of the first trunking aware switch to a first mode in which traffic received on the first port set in the first mode is directed to a first predetermined native VLAN of the plurality of VLANs; receiving a request for remote boot from the first remote boot client on the first port of the first trunking aware switch, the first port being set in the first mode; directing the request for remote boot from the first trunking aware switch to a second port of the remote boot server, the second port being configured to receive traffic on the first predetermined native VLAN of the plurality of VLANs; receiving selected files from the remote boot server on the first predetermined native VLAN and forwarding the received files to the first remote boot client on the first predetermined native VLAN, the selected files being operative to enable the first remote boot client to initiate loading and booting a selected operating system, and switching the first port of the first trunking aware switch from the first mode to a second mode that enables the first remote boot client to specify one of the plurality of VLANs and to send traffic to the first trunking aware switch on the specified one of the plurality of VLANs.

The switched network may be 802.1q compliant, for example. The switched network may further include a network file system coupled to the switch, and the method may further include a step of the first remote boot client requesting additional files from the network file system over the first port configured in the second mode. The request for remote boot in the receiving step may be carried out according to the Preboot Execution Environment (PXE) standard client-server interface, for example. A step of the first trunking aware switch receiving traffic from the first remote boot client may be carried out, the received traffic including frames comprising VLAN tags specifying one of the plurality of VLANs. The selected files in the receiving step may enable the first remote boot client to create a RAM disk that is configured to be mounted as a root file system from to enable programs to be run from the mounted RAM disk. The switched network may include a second remote boot client that is coupled to a second trunking aware switch, the second trunking aware switch being coupled to the first trunking aware switch via ports configured in the second mode that enable the second remote boot client to specify one of the plurality of VLANs in addition to the first predetermined native VLAN. The method may further include a step of the second remote boot client requesting remote boot on the first predetermined native VLAN and receiving selected files from the remote boot server, across both first and second trunking aware switches, on the first predetermined native VLAN via the ports configured in the second mode.

DETAILED DESCRIPTION

Figure 1:
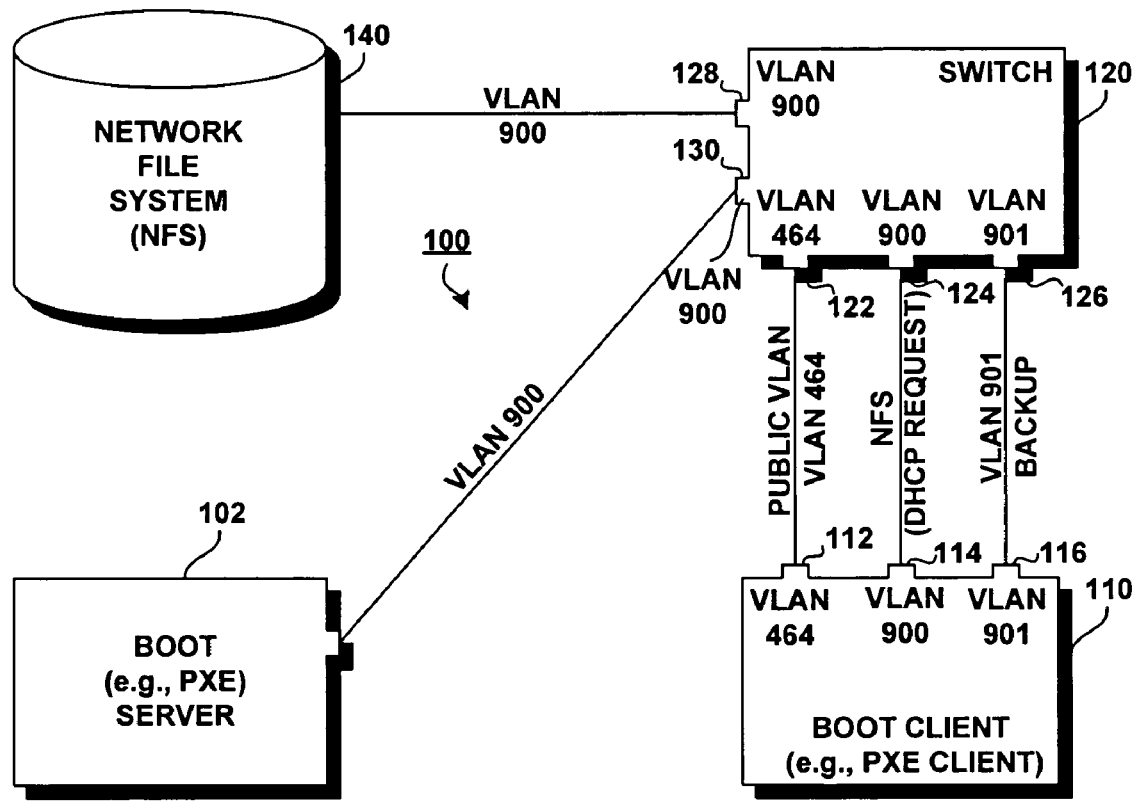
FIG. 1 shows a conventional computer system in which a remote boot client is configured for remote loading and booting of its operating system.

FIG. 1 shows a conventional networked computer system 100 in which a remote boot client is configured for remote loading and booting of its operating system. As shown therein, the networked computer system 100 includes a remote boot server (e.g., a PXE server) 102, a remote boot client (e.g., a PXE client) 110, a network switch 120 and a network file system (NFS) 140. The remote boot client 110 may be stateless and diskless, meaning that it must obtain its operating system from the network, that it must be booted from its local RAM and that it may be returned to a reference state. Port 112 of the boot client 110 may be coupled to port 122 of the switch 120. Ports 112 and 122 may be configured as access (public), meaning that the ports may be assigned to a specific VLAN. In the exemplary representation of FIG. 1, that specific VLAN is VLAN 464. A NFS cable may also be provided, coupled to port 114 of the boot client 110 and to port 124 of the switch 120—both of which may be configured for VLAN 900. A backup cable may be present, coupling port 116 of the boot client 110 to port 126 on the network switch 120, which may be configured for VLAN 901. To initiate a transfer of the files necessary to load an operating system from the network file system 140, the boot client may issue a Dynamic Host Configuration Protocol (DHCP) discover request on VLAN 900 to find all available remote boot servers on the network. Typically, the DHCP discover request is implemented as a User Datagram Protocol (UDP) packet with a broadcast destination of 255.255.255.255. UDP is one of the core protocols of the Internet protocol suite, and is a minimal message-oriented transport layer protocol that is currently documented in IETF RFC 768. Using UDP, programs on networked computers can send short messages known as datagrams to one another. Its stateless nature is useful for servers that answer small queries for large numbers of clients. The boot server 102, which has a port configured for VLAN 900 coupled to port 130 (also configured for VLAN 900) may then respond to the discover request with a DHCP Offer, in which the boot server 102 determines the configuration based on the client's hardware address. The boot client 110 may then respond with a DHCP Request that selects a configuration based upon the DHCP Offer packets it has received. The DHCP exchanges between the boot client 110 and the boot server 102 may also use the NFS cable, coupled between ports 114 and 124 in FIG. 1, before it is used as a NFS cable. The boot server 102 then acknowledges this selection by issuing a DHCP acknowledge packet. The boot server 102 may then send files to the boot client 110 that will enable the boot client 110 to load its operating systems from the network file system 140 or via the Boot Server 102. Such files may include, for example, a kernel (such as VMLinux or VMLinuz, for example) and a compressed "Initrd" file. The Initrd file provides the capability to create and load a RAM disk on the remote boot client 110. The RAM disk may then be mounted as the root file system and programs may be run from this RAM disk. The necessary files to load the RAM disk may then be obtained from the Network File System 140, again over the VLAN 900 in the example of FIG. 1, over port 128 of switch 120 and thereafter to the remote boot client 110. In this manner, Initrd may allow system startup to occur in two phases, where the kernel comes up with a minimum set of compiled-in drivers, and where additional modules are loaded from the Network File System 140 using a shell script, for example. As can be seen from FIG. 1, three cables may be necessary to couple a boot client to a networked computer system of FIG. 1, and six cables are necessary if High-Availability (bonding) is desired. When there are multiple remote boot clients in each of a plurality of racks of such remote boot clients, the number of cables rapidly increases, with consequent increases in costs and decreases in reliability.

Figure 2:
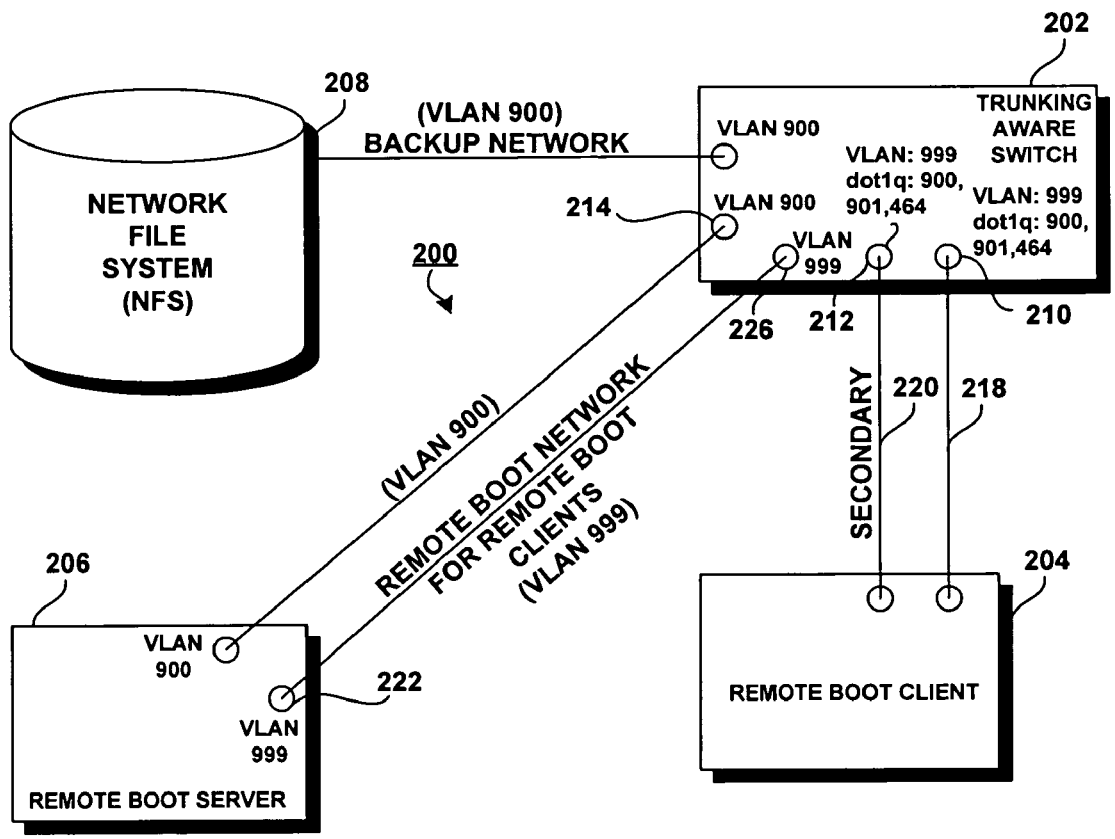
FIG. 2 shows a computer system configured both for multiple Virtual Local Area Networks and for remote boot, according to an embodiment of the present invention.

FIG. 2 shows a computer system configured multiple VLANs and for remote boot, according to an embodiment of the present invention. As shown, the computer system 200 of FIG. 2 may include a remote boot server 206 and a remote boot client 204. A Network File System 208 (similar to that shown at 140 in FIG. 1) may be coupled to a switch 202. The switch 202 may be a trunking aware switch. That is, the trunking aware switch 202 may include a port or ports that may be configured in either access mode (promiscuous or isolated mode), or in tagged mode (trunk, or dot1q mode). The trunking aware switch 202, according to an embodiment of the present invention, may be provided with at least one additional port 210 and NIC configured for a first predetermined native VLAN ID number (such as, for example, a VID number), such as, for example, VLAN 999. This firs predetermined native VLAN ID (999, for example) may be used during the remote boot procedure, as detailed below. The trunking aware switch 202 may also include other ports, which may be selectively configured in access mode that are dedicated to a single network, or in tagged mode, in which all Ethernet traffic must specify a VLAN ID number. The additional port 210 that is configured in access mode to the predetermined native VLAN ID number (VLAN 999 in the example developed being developed herein) may later be configured to operate in tagged mode, such as after the remote boot operation has initiated.

As also shown in FIG. 2, the remote boot server 206 may also include at least one additional port 222 configured for the same first predetermined native VLAN ID number as was the additional port(s) 210, 226 on the trunking aware switch 202. For example, the additional port 222 on the remote boot server 202 may be configured for VLAN ID 999, the same VLAN ID number as was configured the additional port 210 on the trunking aware switch 202. For example, the additional port 210 on the trunking aware switch may be selectively configured to be a non-trunking port or an 802.1q-compliant port, such as a so-called "dot1q" port, for example.

By configuring the additional ports 210 in a non-trunking mode, when the remote boot client 204 (such as a PXE or equivalent client, for example) broadcasts a DHCP request to the destination address 255.255.255.255 to port 210 (now configured in access mode that does not require a VLAN tag), the request sent to the port 210 of the trunking aware switch 202 (configured for the first predetermined native VLAN—such as VLAN 999) will also be visible to port 226 on the trunking aware switch 202 and will also be visible to the remote boot server 206 on port 222, which is also natively configured for VLAN 999. More particularly, the Ethernet traffic sent out by the remote boot client 204 to the additional port 210 on the trunking aware switch 202 will be visible only to ports (210, 226 and 22) having the same VLAN ID number—that is, VLAN 999. The remote boot server 206 also has an additional port or ports 222 configured for VLAN 999 and will see, therefore, the remote boot client's DHCP request broadcasted to 255.255.255.255 on its VLAN 999 port, even through the DHCP request itself does not include a VLAN tag specifically identifying VLAN 999. Alternatively, the initial DHCP discover request may be sent to port 212 of the trunking aware switch, which may be coupled to the remote boot client 204 via a secondary NIC, as shown at 220.

The remote boot server 206 may then negotiate with the remote boot client 204 on VLAN 999 and transmit thereto the files (e.g., the kernel and an Initrd file, among other possibilities) necessary for the remote boot client 204 to initiate the loading and remote booting of its operating system. Moreover, the remote boot client 204, after it has remotely loaded and booted its operating system, may be configured to communicate on any VLAN ID number, such as, for example, VLAN 900. The remote boot client 204 (PXE client, for example) may then access the Network File System 208 over VLAN 900 over a trunking port 214 of the trunking aware switch.

The additional port 210 of the trunking aware switch 202 may then be configured to switch to trunking mode (dot1q mode) in which the frames must include a reference to the target network. The same port 210, therefore, may be configured in access mode (promiscuous mode) to be restricted to VLAN 999 to allow for remote booting and then switched to trunking mode (dot1q mode) to enable the Ethernet packet traffic itself to dictate to which network (VLAN number) each frame should be switched. In the absence of such an additional port 210 on the switch 202 and the port 222 on the remote boot server 206, the trunking aware switch 202 would not "know" to which network to route the DHCP request, as the 255.255.255.255 lacks a VLAN ID number (such as a VID number), as it would have received the DHCP request on a trunking (e.g., "dot1q") port—i.e., one that requires an identification of the target VLAN in the frames it receives.

Figure 3:
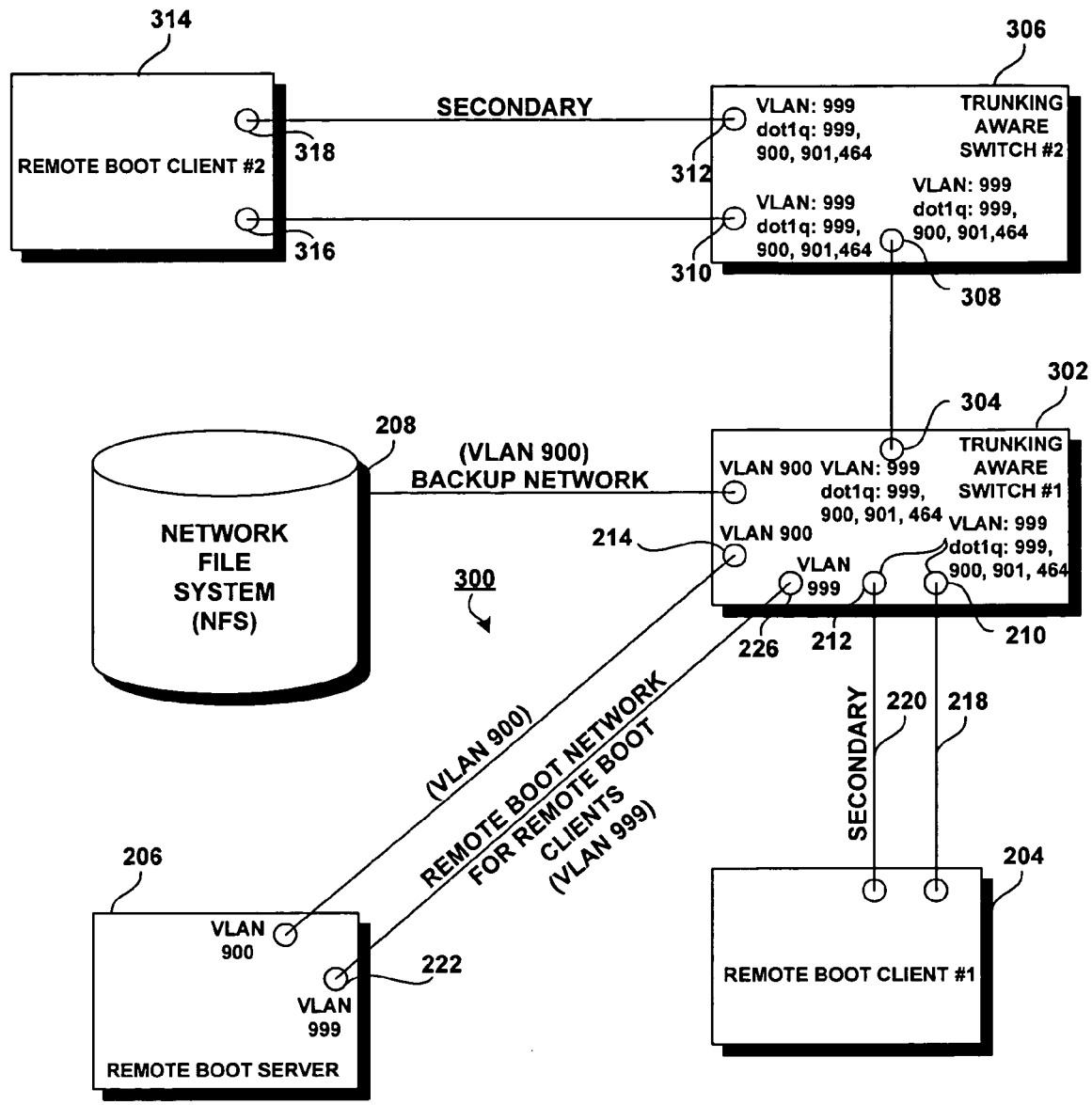
FIG. 3 shows a computer systems configured both for multiple Virtual Local Area Networks and for remote boot across spanning switches, according to an embodiment of the present invention.

FIG. 3 shows a computer system configured both for multiple Virtual Local Area Networks and for remote boot across spanning switches, according to another embodiment of the present invention. The computer system of FIG. 3 includes a Network File System 208, a remote boot server 206 and a first remote boot client 204, each identical to that shown in FIG. 2 at corresponding reference numerals. The system 300 may also include the first trunking aware switch 302, modified such that ports 210 and 212, when in trunking mode, may also be configured for the first predetermined native VLAN (in the example developed herein, VLAN 999) that is used during the remote boot procedure. That is, the additional ports 210, 212 may be configured in the first mode (access/promiscuous/isolated) for the first predetermined native VLAN ID (999 in this example) and may also be selectively configured in the second mode (tagged/trunk/dot1q) to recognize packets configured for VLAN 999 (the VLAN used during remote boot operations) as well as VLANs 900 and 901 (the VLAN ID numbers used herein are used for exemplary purposes only and are not to be construed as limiting the scope of any embodiments of the present invention). One or more ports 304 may be provided in the first trunking aware switch 302, which port (s) 304 may be configured in the same manner as ports 210, 212—that is to recognize traffic on VLAN 999 in the first mode and to be selectively switched to the second mode and configured to recognize traffic configured for VLANs 999, 900 and 901. The system 300 may also include a second trunking aware switch 306 that may be coupled to port 304 of the first trunking aware switch 302 via port 308, which may be configured for first predetermined native VLAN 999 in the first mode and for VLAN 999, 900 and 901 in the second mode. A second remote boot client 314 may be coupled to the second trunking aware switch 306 via ports 318, 312, 316 and 310 that may also be configured for the first predetermined native VLAN 999 in the first mode and for VLANs 999, 900 and 901 in the second mode. Such a system 300 enables the remote booting of the second remote boot client 314, which spans both trunking aware switches 306, 302. In this manner, when the second remote boot client 314 broadcasts a DHCP discover request to, for example, port 310 of the second trunking aware switch 306, such DHCP discover request will be visible to the remote boot server 206, through its port 222, which is natively configured for VLAN 999, even through the second trunking aware switch 306 is not coupled to the remote boot server 206. Indeed, as the DHCP discover request was broadcast on VLAN 999 to port 310 configured in the first mode, such request is visible to the first trunking aware switch 302 at ports 304 and 226 and thereafter to the remote boot server 206 at port 222. Port 310 of the secondary trunking aware switch may then be configured in the second "dot1q" mode, and the method outlined above may be carried out to enable remote booting of the second remote boot client 314. Alternatively, the port 310 may remain in the second mode, as port 310 is configured for VLAN 999 in both the first and second modes.

According to this embodiment, all ports within the system 300 may be dot1q-enabled ports, with the exception of the ports of the remote boot server(s), and the port(s) of the Network File System (NFS). In turn, this entails that all packets to and from the first and second remote boot clients 204, 314 should include the predetermined VLAN tag in both the first and second modes. The packets exchanged between the trunk ports 304, 308 between the first and second trunking aware switches 302, 306 should also include the predetermined VLAN tag to identify the VLAN number on which to send and receive packets.

Figure 4:
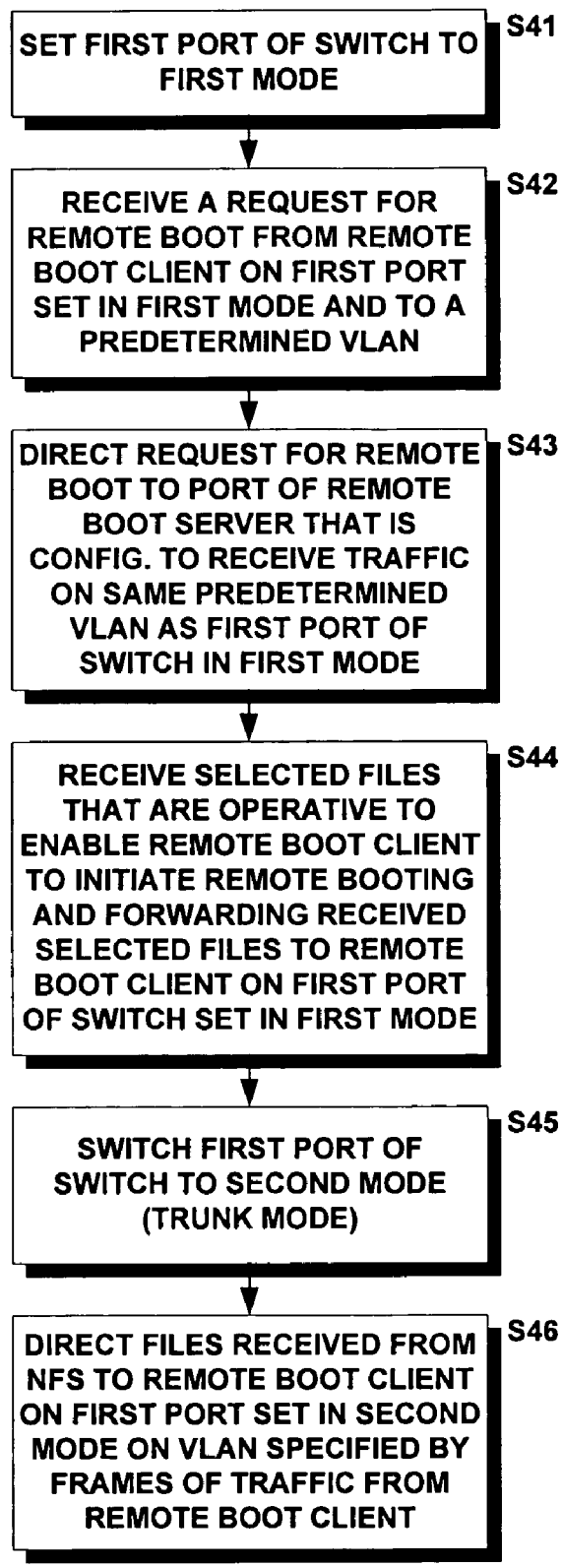
FIG. 4 is a flowchart showing a method of enabling remote booting of a remote boot client in a switched network defining a plurality of VLANs, according to an embodiment of the present invention

FIG. 4 is a flowchart showing a method of enabling remote booting of a remote boot client in a switched network defining a plurality of virtual local area networks (VLANs), according to an embodiment of the present invention. As shown therein, step S41 calls for setting a first port of the trunking aware switch to a native VLAN or promiscuous/isolated mode. The first mode may be such that traffic received on the first port set in the first mode is directed to a first predetermined native VLAN of the plurality of VLANs, such as VLAN 999 in the example developed relative to FIG. 2. Step S42 then calls for the receipt of a request for remote boot (such as a DHCP discover request, for example) from the remote boot client on the first port of the trunking aware switch, which is set in the first mode (e.g., access, promiscuous/isolated mode) and to the first predetermined native VLAN. Such a request for remote boot may take the form of, for example, at broadcast to destination address 255.255.255.255. This discover request for remote boot may then be directed, as called for by step S43, to a second port on the remote boot server that is configured to receive traffic on the same first predetermined native VLAN as the first port (set in the first mode) of the trunking aware switch. In the example above, this first predetermined native VLAN is VLAN 999, although it may be any selected VLAN. As shown at step S44, the trunking aware switch may then receive selected files from the remote boot server on the first predetermined native VLAN. These selected files may be operative to enable the remote boot client to initiate remote booting such as, for example, VMLinux and Initrd. These selected files received from the remote boot server may then be forwarded to the remote boot client on the first port of the switch that is set to the first predetermined VLAN. As called for by step S45, the trunking aware switch may then set the first port to a second mode (e.g., trunking or dot1q mode). The second mode enables the remote boot client to specify one of the plurality of VLANs and to send traffic to the trunking aware switch on the specified VLAN. The remote boot client may specify a particular VLAN in its traffic with the trunking aware switch by specifying a VLAN in a header appended to the Ethernet traffic frames sent to the trunking aware switch, for example. The trunking aware switch may then direct any files received from the Network File System (NFS) to the remote boot client over the specified VLAN (such as VLAN 900, for example, as shown in FIG. 2), to enable the remote boot client to complete its remote booting procedure, as called for by step S46.

From the foregoing, it may be appreciated that embodiments of the present invention enable remote booting of remote boot clients within a trunking environment complying with protocols such as 802.1q or ISL, for example. Utilizing embodiments of the present invention, the number of cables and NICs that are required decreases, as only a single NIC/cable combination and a single NIC/backup cable may be necessary to both remote load and boot the remote boot client 204 and to access a plurality of VLANs from the remotely booted clients.

Embodiments of the present invention are related to the use of computer system and/or to a plurality of such computer systems to enable methods and systems for enabling remote booting of a remote boot client in a switched network defining a plurality of VLANs. According to one embodiment, the methods and systems described herein may be provided by one or more computer systems in response to processor(s) executing sequences of instructions contained in memory. Such instructions may be read into memory from a computer-readable medium, such as a data storage device. Execution of the sequences of instructions contained in memory causes the processor(s) of the trunking aware switch to perform the steps and to have the functionality described herein. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method of enabling remote booting of a remote boot client in a switched network defining a plurality of virtual local area networks (VLANs), the switched network including a first trunking aware switch, a first remote boot client and a remote boot server, the method including steps of:

setting a first port of the first trunking aware switch to a first mode in which traffic received on the first port set in the first mode is directed to a first predetermined native VLAN of the plurality of VLANs;

receiving a request for remote boot from the first remote boot client on the first port of the first trunking aware switch, the first port being set in the first mode;

directing the request for remote boot from the first trunking aware switch to a second port of the remote boot server, the second port being configured to receive traffic on the first predetermined native VLAN of the plurality of VLANs;

receiving selected files from the remote boot server on the first predetermined native VLAN and forwarding the received files to the first remote boot client on the first predetermined native VLAN, the selected files being operative to enable the first remote boot client to initiate loading and booting a selected operating system, and switching the first port of the first trunking aware switch from the first mode to a second mode that enables the first remote boot client to specify one of the plurality of VLANs and to send traffic to the first trunking aware switch on the specified one of the plurality of VLANs.

2. The computer-implemented method of claim 1, wherein the switched network is 802.1q compliant.

3. The computer-implemented method of claim 1, wherein the switched network further includes a network file system coupled to the switch, and wherein the method further includes a step of the first remote boot client requesting additional files from the network file system over the first port configured in the second mode.

4. The computer-implemented method of claim 1, wherein the request for remote boot in the receiving step is carried out according to the Preboot Execution Environment (PXE) standard client-server interface.

5. The computer-implemented method of claim 1, further comprising a step of the first trunking aware switch receiving traffic from the first remote boot client, the received traffic including frames comprising VLAN tags specifying one of the plurality of VLANs.

6. The computer-implemented method of claim 1, wherein the selected files in the receiving step enable the first remote boot client to create a RAM disk that is configured to be mounted as a root file system from to enable programs to be run from the mounted RAM disk.

7. The computer-implemented method of claim 1, wherein the switched network includes a second remote boot client that is coupled to a second trunking aware switch, the second trunking aware switch being coupled to the first trunking aware switch via ports configured in the second mode that enable the second remote boot client to specify one of the plurality of VLANs in addition to the first predetermined native VLAN, and wherein the method further includes a step of the second remote boot client requesting remote boot on the first predetermined native VLAN and receiving selected files from the remote boot server, across both first and second trunking aware switches, on the first predetermined native VLAN via the ports configured in the second mode.

8. A computer system suitable for enabling remote booting of a first remote boot client in a switched network defining a plurality of native virtual local area networks (VLANs), the computer system comprising:
a first remote boot client;
a remote boot server;
a first trunking aware switch, the first trunking aware switch including:
at least one processor;
a plurality of processes spawned by said at least one processor, the processes including processing logic for:
setting a first port of the first trunking aware switch to a first mode in which traffic received on the first port set in the first mode is directed to a first predetermined native VLAN of the plurality of VLANs;
receiving a request for remote boot from the first remote boot client on the first port of the first trunking aware switch, the first port being set in the first mode;
directing the request for remote boot from the first trunking aware switch to a second port of the remote boot server, the second port being configured to receive traffic on the first predetermined native VLAN of the plurality of VLANs;
receiving selected files from the remote boot server on the first predetermined VLAN and forwarding the received files to the first remote boot client on the first predetermined native VLAN, the selected files being operative to enable the first remote boot client to initiate loading and booting a selected operating system, and
switching the first port of the first trunking aware switch from the first mode to a second mode that enables the first remote boot client to specify one of the plurality of VLANs and to send traffic to the first trunking aware switch on the specified one of the plurality of VLANs.

9. The computer system of claim 8, wherein the switched network is 802.1q compliant.

10. The computer system of claim 8, wherein the switched network further includes a network file system coupled to the switch, and wherein the method further includes a step of the first remote boot client requesting additional files from the network file system over the first port configured in the second mode.

11. The computer system of claim 8, wherein the request for remote boot in the receiving step is carried out according to the Preboot Execution Environment (PXE) standard client-server interface.

12. The computer system of claim 8, further comprising a step of the first trunking aware switch receiving traffic from the first remote boot client, the received traffic including frames comprising VLAN tags specifying one of the plurality of VLANs.

13. The computer system of claim 8, wherein the selected files in the receiving step enable the first remote boot client to create a RAM disk that is configured to be mounted as a root file system from to enable programs to be run from the mounted RAM disk.

14. The computer system of claim 8, wherein the switched network includes a second remote boot client that is coupled to a second trunking aware switch, the second trunking aware switch being coupled to the first trunking aware switch via ports configured in the second mode that enable the second remote boot client to specify one of the plurality of VLANs in addition to the first predetermined native VLAN, and wherein the plurality of processes further include processing logic for the second remote boot client to request remote boot on the first predetermined native VLAN and to receive selected files from the remote boot server, across both first and second trunking aware switches, on the first predetermined native VLAN via the ports configured in the second mode.

15. A computer-readable medium having data stored thereon representing sequences of instructions which, when executed by a first trunking aware switch, causes said first trunking aware switch to enable remote booting of a first remote boot client in a switched network defining a plurality of native virtual local area networks (VLANs) and including a first remote boot client and a remote boot server, by performing the steps of:
setting a first port of the first trunking aware switch to a first mode in which traffic received on the first port set in the first mode is directed to a first predetermined native VLAN of the plurality of VLANs;
receiving a request for remote boot from the first remote boot client on the first port of the first trunking aware switch, the first port being set in the first mode;
directing the request for remote boot from the first trunking aware switch to a second port of the remote boot server, the second port being configured to receive traffic on the first predetermined native VLAN of the plurality of VLANs;
receiving selected files from the remote boot server on the first predetermined native VLAN and forwarding the received files to the first remote boot client on the first predetermined native VLAN, the selected files being operative to enable the first remote boot client to initiate loading and booting a selected operating system, and switching the first port of the first trunking aware switch from the first mode to a second mode that enables the first remote boot client to specify one of the plurality of VLANs and to send traffic to the first trunking aware switch on the specified one of the plurality of VLANs.

16. The computer-readable medium of claim 15, wherein the switched network is 802.1q compliant.

17. The computer-readable medium of claim 15, wherein the switched network further includes a network file system coupled to the switch, and wherein the method further includes a step of the first remote boot client requesting additional files from the network file system over the first port configured in the second mode.

18. The computer-readable medium of claim 15, wherein the request for remote boot in the receiving step is carried out according to the Preboot Execution Environment (PXE) standard client-server interface.

19. The computer-readable medium of claim 15, further comprising a step of the first trunking aware switch receiving traffic from the first remote boot client, the received traffic including frames comprising VLAN tags specifying one of the plurality of VLANs.

20. The computer-readable medium of claim 15, wherein the selected files in the receiving step enable the first remote boot client to create a RAM disk that is configured to be mounted as a root file system from to enable programs to be run from the mounted RAM disk.

21. The computer-readable medium of claim 15, wherein the switched network includes a second remote boot client that is coupled to a second trunking aware switch, the second trunking aware switch being coupled to the first trunking aware switch via ports configured in the second mode that enable the second remote boot client to specify one of the plurality of VLANs in addition to the first predetermined native VLAN, further comprising the second remote boot client requesting remote boot on the first predetermined native VLAN and receiving selected files from the remote boot server, across both the first and second trunking aware switches, on the first predetermined native VLAN via the ports configured in the second mode.

* * * * *

UNITED STATES PATENT AND TRADEMARK OFFICE
CERTIFICATE OF CORRECTION

| | | |
|---|---|---|
| PATENT NO. | : 7,512,139 B2 | Page 1 of 1 |
| APPLICATION NO. | : 11/435904 | |
| DATED | : March 31, 2009 | |
| INVENTOR(S) | : Wong et al. | |

It is certified that error appears in the above-identified patent and that said Letters Patent is hereby corrected as shown below:

In column 11, line 4, in claim 1, delete "truniking" and insert -- trunking --, therefor.

In column 14, line 19, in claim 21, after "both" delete "the".

Signed and Sealed this

Fifteenth Day of June, 2010

David J. Kappos
*Director of the United States Patent and Trademark Office*